Oct. 19, 1943.  G. W. FILES  2,332,375
METHOD AND MEANS FOR IDENTIFYING X-RAY FILM
Filed June 13, 1941
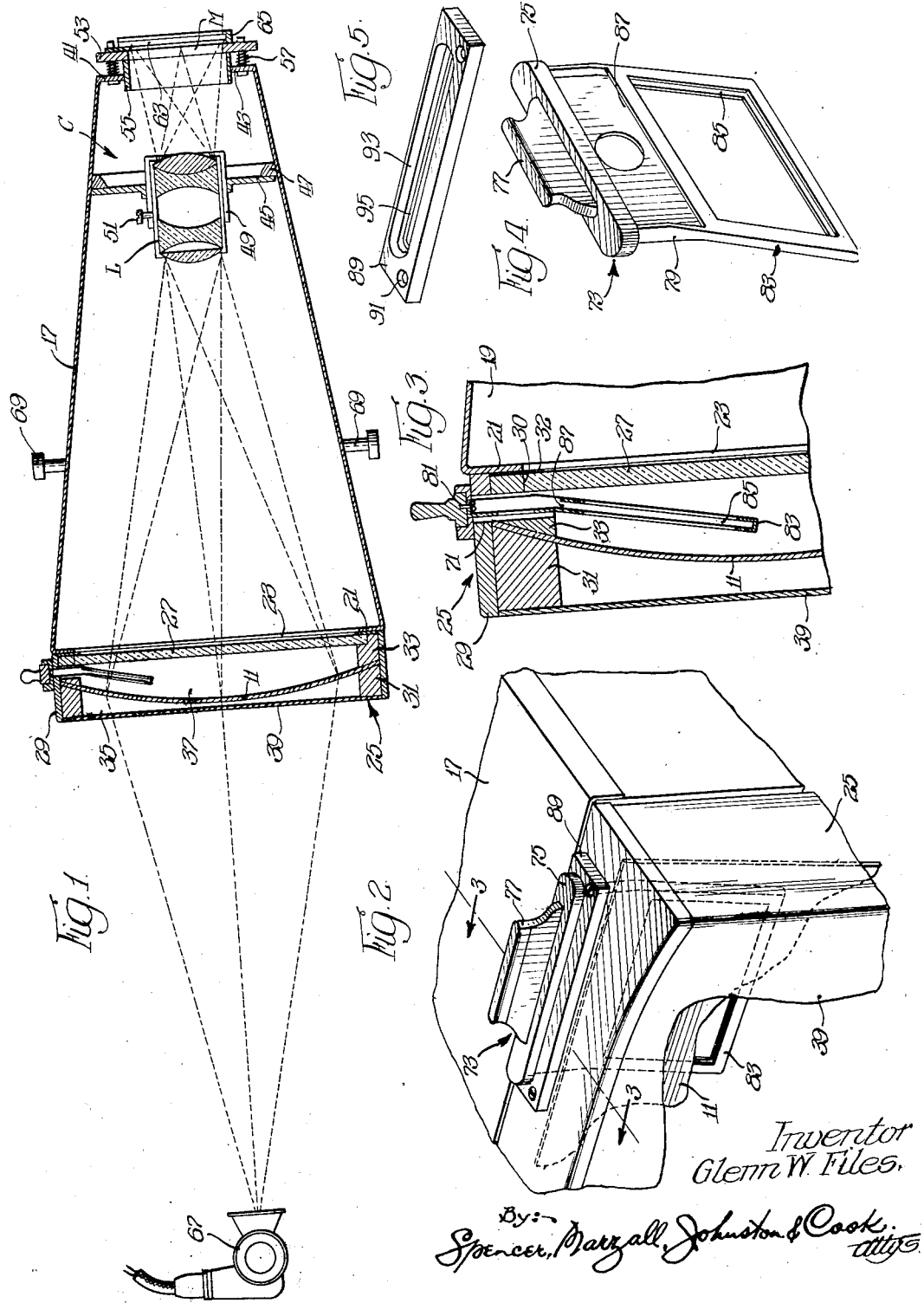
Inventor
Glenn W. Files.

Patented Oct. 19, 1943

2,332,375

UNITED STATES PATENT OFFICE 2,332,375

METHOD AND MEANS FOR IDENTIFYING X-RAY FILM

Glenn W. Files, Elmwood Park, Ill., assignor to General Electric X-Ray Corporation, Chicago, Ill., a corporation of New York Application June 13, 1941, Serial No. 397,926

11 Claims. (Cl. 250—67)

This invention relates in general to photography and has more particular reference to means for and method of marking a light-sensitive film for subsequent identification during the exposure of the film, the invention more particularly relating to the marking of films in photofluorography, that is to say, the making of photographic reproductions of images formed on fluoroscopic screens under the influence of X-rays.

Photofluorographic pictures on light-sensitive film may be made by creating a fluoroscopic image on a suitable screen by action of rays, such as X-rays, impinging on the screen and by then making a photograph of the screen by means of a camera which preferably embodies a so-called fast lens; and an important object of the present invention is to provide means for marking a light-sensitize film during exposure thereof in the camera; a further object being to utilize light rays emitted by the fluoroscopic screen to mark the film with identifying indicia during the exposure of the film in photographing a fluoroscopic image on the screen.

Another important object is to accomplish the marking by interposing, between the screen and the film to be marked, a template having opaque portions and bearing the desired identifying indicia to be marked on the film; a further object being to utilize a card having opaque portions forming indicia thereon as a means for marking the film; a still further object being to utilize a card having typewritten indicia thereon as a template for marking the film.

Another important object is to provide a photofluorographic camera, including a fluorescent screen, a lens, and means for supporting light-sensitive film in position to be exposed to light rays emanating from the screen, the camera including facilities for disposing a film marking template in the path of light rays emanating from the screen in a direction to impinge upon the mounted film; a further object being to form the camera with a template mounting adjacent the screen; a still further object being to form the mounting as a frame readily removable from the camera in order to facilitate template removal and replacement.

Another important object is to provide a camera formed with a slot adjacent the screen, in which slot may be removably mounted a template frame having an exposed handle portion to facilitate the mounting and removal of the frame in the slot; a further object being to provide a frame in the form of a plate carrier in which a plate or card bearing marking indicia may be removably mounted.

These and numerous other objects, advantages, and inherent functions of the invention will become apparent as the invention is more fully understood from the following description, which, taken in connection with the accompanying drawing, discloses a preferred embodiment of the invention.

Referring to the drawing:

Figure 1 is a sectional view through a photofluorographic camera, including a fluorescent screen in position to be influenced by X-rays from a suitable source, the camera including film marking facilities embodying my present invention.

Figure 2 is a perspective view of a portion of the camera shown in Figure 1;

Figure 3 is a sectional view taken substantially along the line 3—3 in Figure 2; and Figures 4 and 5 are perspective views of parts of the assembly.

To illustrate my invention, I have shown on the drawing a camera C comprising a lens L and a film mounting M mounted in a preferably light-tight box 17 of sleeve-like configuration, at one end of which is mounted a fluoroscopic screen 11, the film mounting M being positioned at the other end of the box with the lens L disposed within the box between the screen 11 and the film mounting M.

The sleeve-like box 17 may be constructed of any suitable material, such as wood or sheet metal, and is tapered from its larger end, at which the screen 11 is mounted, toward its film-carrying end. The screen-carrying end of the box may be formed with an inwardly disposed flange 21 defining an opening 23 to which may be attached a support frame 25 carrying the screen 11, the frame being anchored in place at the opening 23 by suitable fastening means which engage the frame and the flange 21 to hold the parts together. The frame 25 preferably comprises a peripheral rim 29 within which is mounted a pair of screen supporting frames 31 and 33, the frame 33 being disposed in the rim 29 at the end thereof facing the end of the box 17 and being preferably formed with a seat 30 in which may be mounted a pane of glass 27. This pane 27 may comprise lead glass, which is substantially transparent to light generated by the fluorescent screen 11 when excited by X-rays, the glass being substantially opaque to X-rays, thereby preventing the passage of X-rays beyond the glass into the camera, while permitting light rays from the screen 11 to enter the camera for impingement on a light-sensitive film in the mounting M. The pane of glass may be held in the seat 30 by any suitable fastening device, such as the clip means 32.

As shown in the drawing, the screen 11 is curved, having a concave face facing the camera lens L, the curvature of the screen being of such degree that light rays emanating from remote points in the screen 11 and passing through the lens assembly L become focused in the flat plane of a film supported in the mounting M, thus eliminating coma and spherical aberration. To this end, the mounting frames 31 and 33, respectively, have side members 35 and 37 curved in conformity with the curvature of the screen 11, the screen being held at its edges by and between the mounting frames 31 and 33 which are secured together upon the screen and in the frame 25 in any suitable fashion, as by means of fastening members which penetrate the edges of the screen and hold the frames 31, 33 together and upon the flange 21.

The screen is thus assembled and secured in the frame 25, the outwardly facing end of which may be covered by a finishing panel 39 which, as shown in the illustrated embodiment, may be curved in a vertical plane, the top and bottom members of the frame 31 being formed to provide suitable curved seats for receiving and supporting the panel 39. The panel 39, of course, is of a material substantially transparent to X-rays in the illustrated embodiment of the invention.

The film-carrying end of the box 17 is preferably formed with an inturned flange 41 defining an opening 43, and the lens assembly L may be supported within the box on a panel 45 anchored in place as by means of a molding 47. The panel 45 has a central opening carrying a sleeve 49 secured therein, the sleeves serving to support the lens assembly L, which may be clamped in adjusted position in the sleeve by means of a set screw 51. The film holder M comprises a panel 53 formed with a central opening and a sleeve 55 extending from the panel around the opening in position to snugly and slidingly fit within the opening 43 of the box, the edges defining said opening being preferably fitted with felt to provide a light-tight joint with the sleeve 55. The edges of the panel 53 outwardly of the opening 43 and the flange 41 are provided with aligned openings for the reception of bolts 57, which extend through the flange 41 and through the panel 53 and which are provided with springs normally urging the panel outwardly on the bolts away from the end of the box. The panel 53 carries grooved flanges 63 on opposite sides and a bottom stop 65, the flanges and stop serving to slidably receive and support a film cassette or plate holder in position opposite the panel opening. The film holder may, of course, be of any suitable or preferred form, providing a seat for a light-sensitive film or plate and a removable cover for enclosing the plate in the seat so that the film may be retained in light tight condition enclosed in the cassette until the same has been mounted in position on the panel 53 when, by withdrawing the cassette cover, the film may be uncovered in the panel opening in position opposite the lens to be exposed.

The box 17 may, of course, be provided with any suitable means for supporting the same in operative position, such means usually comprising brackets 69 fastened thereon approximately opposite the center of gravity of the box, and these brackets may be formed for attachment on any support means on which it may be desired to mount the apparatus.

The fluoroscopic screen 11 is activated by impingement thereon of rays under the influence of which the screen is adapted to fluoresce. In the illustrated embodiment, I have shown, in Figure 1, an X-ray tube mounting 67 in position to direct rays emanating from an X-ray source in the mounting 67 upon the screen 11 through the cover panel 39. By interposing a body or bodies between the source of X-rays and the screen 11 as, for example, by placing the body upon or against the panel 39, an image of said body may be formed on the fluorescent screen 11, which becomes luminescent in proportion to the intensity of X-rays impinging thereon, which consequently produces an image of the body in accordance with the relative translucence of the body and its several parts to the passage of X-rays. Curvature of the panel 39 is for the purpose of facilitating the positioning of a human body in shadow-casting position with respect to the screen 11, the apparatus shown being particularly adapted for the making of pictures of the torso portions of the human body.

The lens L being adjusted to focus light rays emanating from the screen 11 upon a film supported in the mounting M, a picture of the screen image may be made on the film by exposing the same in the mounting. In order to apply an identifying marking upon the film, I provide a slot 71 in the frame 25, said slot being preferably arranged at the top of the frame adjacent one side thereof and extending through and opening within the screen supporting frame 33, said slot being of a size to receive the body of the template holder 73. The holder 73 comprises a head 75 formed with a handle 77 on one side of the head and sheet metal means 79 secured on the opposite side of the head, as by means of fastening screws 81. Said sheet metal means 79 comprises a preferably rectangular frame 83 forming a pocket 85 for the reception of an indicia bearing template, one side of the frame being formed with a slot to facilitate insertion and removal of the template.

The marking template may comprise portions relatively transparent to light rays of the character emitted by the screen 11 and portions of lesser transparency arranged to form marking indicia, and I prefer to utilize template cards carrying typewritten indicia thereon, as typewritten cards are entirely satisfactory for the purpose of marking film and, in addition, are extremely inexpensive. The frame 83 is therefore sized to receive a standard card which may be inserted or removed from the frame through the slot 87 when the carrying frame 73 is removed from the camera. In order to support the frame 73 accurately in position in the slot 71, a finishing plate 89 may be fastened on the frame 25 at the opening 71, as by means of fastening screws extending in holes 91 formed in the plate 89, said plate being formed with a seat 93 for snugly receiving the head 75 and an opening 95 within the seat in alignment with the opening 71.

It is thought that the invention and its numerous attendant advantages will be understood from the foregoing description, and it is obvious, of course, that numerous changes may be made in the form, construction, and arrangement of of the several parts without departing from the spirit and scope of the invention or sacrificing any of its attendant advantages, the form herein disclosed being a preferred embodiment for the purpose of demonstrating the invention; and I do not herein claim, per se, the curved screen 11, since the same comprises subject-matter claimed in my co-pending application Serial No. 304,999, filed November 17, 1939, of which the present application is a continuation-in-part, and upon which Letters Patent No. 2,248,976 issued July 15, 1941.

The invention is hereby claimed as follows:

1. Apparatus for the photography of screened images comprising the combination, with a luminescent screen for carrying the image to be pictured and a camera having holder means for supporting a picture receiving film in position for exposure to light emanating from the screen, of mounting means for supporting a template having portions relatively transparent and relatively opaque to light rays emanating from the screen to form an indicia pattern, said means for supporting the template being formed to carry the template in position between said screen and said film holder means whereby to apply on the film, during the exposure thereof, a marking corresponding with the indicia formed in the template, said screen being curved and said mounting means being positioned to support the template adjacent and substantially parallel to a portion of said curved screen and being relatively removed from said holder means.

2. Apparatus for the photography of screened images comprising the combination, with a luminescent screen for carrying the image to be pictured and a camera having holder means for supporting a picture receiving film in position for exposure to light emanating from the screen, of mounting means for supporting a template having portions relatively transparent and relatively opaque to light rays emanating from the screen to form an indicia pattern, said means for supporting the template being formed to carry the template in position between said screen and said film holder means whereby to apply on the film, during the exposure thereof, a marking corresponding with the indicia formed in the template, said screen being supported in a frame and said mounting means being removably attachable on the frame in position with a template supporting portion of the frame disposed in overlying relationship with respect to a portion of said screen and being relatively removed from said holder means.

3. Apparatus for the photography of screened images comprising the combination, with a luminescent screen for carrying the image to be pictured and a camera having holder means for supporting a picture receiving film in position for exposure to light emanating from the screen, of mounting means for supporting a template having portions relatively transparent and relatively opaque to light rays emanating from the screen to form an indicia pattern, said means for supporting the template being formed to carry the template in position between said screen and said film holder means whereby to apply on the film, during the exposure thereof, a marking corresponding with the indicia formed in the template, said screen being supported in a peripheral frame having a slot and said template mounting comprising a carrier formed to fit removably in said slot and having a template-carrying portion formed to overlie a portion of said screen when said template mounting means is mounted in said slot.

4. Apparatus for the photography of screened images comprising the combination, with a luminescent screen for carrying the image to be pictured and a camera having holder means for supporting a picture receiving film in position for exposure to light emanating from the screen, of mounting means for supporting a template having portions relatively transparent and relatively opaque to light rays emanating from the screen to form an indicia pattern, said means for supporting the template being formed to carry the template in position between said screen and said film holder means whereby to apply on the film, during the exposure thereof, a marking corresponding with the indicia formed in the template, said screen being of material adapted to fluoresce under X-ray excitation, and a pane of material substantially transparent to light rays produced by the screen when excited and substantially opaque to X-rays, said pane being mounted between the screen and said film holder to exclude from a film in said holder X-rays emanating from a screen exciting source while permitting light rays transmitted from the screen through said template to impinge upon the film.

5. Apparatus for the photography of screened images comprising the combination, with a luminescent screen for carrying the image to be pictured and a camera having holder means for supporting a picture receiving film in position for exposure to light emanating from the screen, of mounting means for supporting a template having portions relatively transparent and relatively opaque to light rays emanating from the screen to form an indicia pattern, said means for supporting the template being formed to carry the template in position between said screen and said film holder means whereby to apply on the film, during the exposure thereof, a marking corresponding with the indicia formed in the template, said screen being of material adapted to fluoresce under X-ray excitation, and a pane of material substantially transparent to light rays produced by the screen when excited and substantially opaque to X-rays, said pane being mounted between the screen and said film holder to exclude from a film in said holder X-rays emanating from a screen exciting source while permitting light rays from the screen to impinge upon the film, said template mounting being arranged to support the template in position between said screen and said pane.

6. A camera for the photography of screened images comprising a light-tight housing and support means for mounting light-sensitive film at one end of the housing in position for exposure, a screen comprising a layer of material adapted to fluoresce under the influence of X-rays mounted on said housing in spaced relationship with respect to said support means, a lens assembly mounted in the housing between said screen and said support means in position to focus light rays emanating from said screen upon light-sensitive film carried in said support means, and mounting means for supporting an indicia-carrying template in said camera in position between said screen and said lens whereby the indicia carried by said template will be illuminated by light rays emanating from said screen.

7. A camera for the photography of screened images comprising a light-tight housing and support means for mounting light-sensitive film at one end of the housing in position for exposure, a screen comprising a layer of material adapted to fluoresce under the influence of X-rays mounted on said housing in spaced relationship with respect to said support means, a lens assembly mounted in the housing between said screen and said support means in position to focus light rays emanating from said screen upon light-sensitive film carried in said support means, and mounting means for supporting an indicia-carrying template in said camera in position between said screen and said lens whereby the indicia carried by said template will be illuminated by light rays emanating from said screen, said mounting means comprising a template-carrying frame removably mounted on said camera and having a portion overlying the screen when said carrying frame is in mounted position on the camera.

8. A camera for the photography of screened images comprising a light-tight housing and support means for mounting light-sensitive film at one end of the housing in position for exposure, a screen comprising a layer of material adapted to fluoresce under the influence of X-rays mounted on said housing in spaced relationship with respect to said support means, a lens assembly mounted in the housing between said screen and said support means in position to focus light rays emanating from said screen upon light-sensitive film carried in said support means, said screen having concave curvature facing said lens, and removable mounting means on said camera for supporting an indicia-bearing template adjacent and in position overlying the concave surface of said screen, whereby the indicia carried by said template will be illuminated by light rays emanating from said screen.

9. A camera for the photography of screened images comprising a light tight housing, a screen having a concave face and comprising a layer of material adapted to fluoresce under the influence of X-rays mounted at one end of the housing, support means for mounting light-sensitive film on said housing in spaced relationship with respect to said screen, a lens assembly mounted in the housing between said screen and said support means in position to focus light rays emanating from said screen upon light-sensitive film carried in said support means, said housing having a slot therein adjacent an edge of said screen, and mounting means for supporting an indicia bearing template in position overlying the concave face of said screen adjacent an edge thereof and between the screen and the film, whereby the indicia carried by said template will be illuminated by light rays emanating from said screen, said mounting means being removably supported in said slot.

10. A camera for the photography of screened images comprising a light tight housing, a screen having a concave face and comprising a layer of material adapted to fluoresce under the influence of X-rays mounted at one end of the housing, support means for mounting light-sensitive film on said housing in spaced relationship with respect to said screen, a lens assembly mounted in the housing between said screen and said support means in position to focus light rays emanating from said screen upon light-sensitive film carried in said support means, said housing having a slot therein adjacent an edge of said screen, and mounting means for supporting an indicia bearing template in position overlying the concave face of said screen adjacent an edge thereof and between the screen and the film, whereby the indicia carried by said template will be illuminated by light rays emanating from said screen, said mounting means comprising a frame for demountably receiving said template and formed for removable insertion in said slot in position overlying the edge of said screen.

11. A camera for the photography of screened images comprising a light tight housing, a screen having a concave face and comprising a layer of material adapted to fluoresce under the influence of X-rays mounted at one end of the housing, support means for mounting light-sensitive film on said housing in spaced relationship with respect to said screen, a lens assembly mounted in the housing between said screen and said support means in position to focus light rays emanating from said screen upon light-sensitive film carried in said support means, said housing having a slot therein adjacent an edge of said screen, and mounting means for supporting an indicia bearing template in position overlying the concave face of said screen adjacent an edge thereof and between the screen and the film, whereby the indicia carried by said template will be illuminated by light rays emanating from said screen, said mounting means comprising a frame for demountably receiving said template and formed for removable insertion in said slot in position overlying the edge of said screen, said mounting means being formed to provide a light tight cover for said slot, and a handle extending outwardly of said housing when the frame is mounted in the slot.

GLENN W. FILES.